US012745139B2

(12) United States Patent
Laddu

(10) Patent No.: US 12,745,139 B2
(45) Date of Patent: Sep. 22, 2026

(54) MOBILITY IMPROVEMENTS FOR WIRELESS COMMUNICATION NETWORKS

(71) Applicant: NOKIA TECHNOLOGIES OY, Espoo (FI)

(72) Inventor: Keeth Saliya Jayasinghe Laddu, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 683 days.

(21) Appl. No.: 18/002,418

(22) PCT Filed: Jun. 19, 2020

(86) PCT No.: PCT/EP2020/067174
§ 371 (c)(1),
(2) Date: Dec. 19, 2022

(87) PCT Pub. No.: WO2021/254638
PCT Pub. Date: Dec. 23, 2021

(65) Prior Publication Data
US 2023/0254741 A1 Aug. 10, 2023

(51) Int. Cl.
*H04W 36/00* (2009.01)

(52) U.S. Cl.
CPC ... *H04W 36/0072* (2013.01); *H04W 36/0016* (2013.01)

(58) Field of Classification Search
CPC ...................... H04W 36/0016; H04W 36/0072
See application file for complete search history.

(56) References Cited

U.S. PATENT DOCUMENTS

2011/0044239 A1* 2/2011 Cai ....................... H04L 5/0098 370/328
2020/0112886 A1 4/2020 John Wilson et al.
2020/0145860 A1 5/2020 Koskela et al.
2020/0154466 A1* 5/2020 John Wilson ......... H04L 5/0055
(Continued)

OTHER PUBLICATIONS

International Search Report and Written Opinion for International Application No. PCT/EP2020/067174, mailed on Mar. 25, 2021, 15 pages.
(Continued)

*Primary Examiner* — James P Duffy
(74) *Attorney, Agent, or Firm* — Carter, DeLuca & Farrell LLP

(57) ABSTRACT

According to an example aspect of the present invention, there is provided a method comprising, receiving from a first Transmission and Reception Point, by a user equipment, an indication of a primary set of Transmission Configuration Indication, TCI, states associated with an index and an indication of a secondary set of TCI states associated with the index, wherein the primary set of TCI states is usable for receiving data from the first TRP and the secondary set of TCI states is usable for receiving data from a second TRP, configuring a receiver of the user equipment to receive data from the first TRP in accordance with the primary set of TCI states and receiving, by the user equipment, a mobility trigger and configuring the receiver of the user equipment to receive data from the second TRP in accordance with the secondary set of TCI states upon receiving the mobility trigger.

9 Claims, 6 Drawing Sheets

(56) References Cited

U.S. PATENT DOCUMENTS

| | | | | |
|---|---|---|---|---|
| 2020/0186232 | A1 | 6/2020 | Levitsky et al. | |
| 2020/0221485 | A1* | 7/2020 | Cirik | H04L 25/0224 |
| 2023/0007681 | A1* | 1/2023 | Yuan | H04L 1/1822 |

OTHER PUBLICATIONS

"Revised WID: Enhancements on MIMO for NR", 3GPP TSG RAN Meeting #81, RP-182067, Samsung, Agenda Item: 9.4.1, Sep. 10-13, 2018, 5 pages.

"New WID: Further enhancements on MIMO for NR", 3GPP TSG RAN Meeting #86, RP-193133, Samsung, Agenda Item: 9.1.1, Dec. 9-12, 2019, 5 pages.

"3rd Generation Partnership Project; Technical Specification Group Radio Access Network; NR; Physical layer procedures for data (Release 16)", 3GPP TS 38.214 V16.1.0, Mar. 2020, pp. 1-151.

"3rd Generation Partnership Project; Technical Specification Group Radio Access Network; NR; Medium Access Control (MAC) protocol specification (Release 16)", 3GPP TS 38.321 V16.0.0, Mar. 2020, pp. 1-141.

"3rd Generation Partnership Project; Technical Specification Group Radio Access Network; NR; Radio Resource Control (RRC) protocol specification (Release 16)", 3GPP TS 38.331 V16.0.0, Mar. 2020, pp. 1-835.

Office action received for corresponding European Patent Application No. 20734354.2, dated Jun. 10, 2025, 4 pages.

* cited by examiner

MOBILITY IMPROVEMENTS FOR WIRELESS COMMUNICATION NETWORKS

CROSS-REFERENCE TO RELATED APPLICATIONS

This application is a national stage entry of International Application No. PCT/EP2020/067174, filed Jun. 19, 2020, entitled "MOBILITY IMPROVEMENTS FOR WIRELESS COMMUNICATION NETWORKS" which is hereby incorporated by reference in its entirety.

FIELD

Various example embodiments relate in general to wireless communication networks and more specifically, to mobility improvements for such networks.

BACKGROUND

Mobility of wireless terminals, such as User Equipments, UEs, needs to be enabled in various wireless communication networks without significant connectivity issues. For instance, mobility is very important for cellular networks, such as for networks operating according to Long Term Evolution, LTE, and/or 5G radio access technology. 5G radio access technology may also be referred to as New Radio, NR, access technology. Since its inception, LTE has been widely deployed and 3rd Generation Partnership Project, 3GPP, still develops LTE. Similarly, 3GPP also develops standards for 5G/NR. One of the topics in the 3GPP discussions is related to mobility and according to the discussions there is a need to provide improved methods, apparatuses and computer programs for mobility.

SUMMARY

According to some aspects, there is provided the subject-matter of the independent claims. Some embodiments are defined in the dependent claims.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect of the present invention, there is provided a first method comprising, receiving from a first Transmission and Reception Point, by a user equipment, an indication of a primary set of Transmission Configuration Indication, TCI, states associated with an index and an indication of a secondary set of TCI states associated with the index, wherein the primary set of TCI states is usable for receiving data from the first TRP and the secondary set of TCI states is usable for receiving data from a second TRP, configuring a receiver of the user equipment to receive data from the first TRP in accordance with the primary set of TCI states and receiving, by the user equipment, a mobility trigger and configuring the receiver of the user equipment to receive data from the second TRP in accordance with the secondary set of TCI states upon receiving the mobility trigger. The first method may be performed by a user equipment, or a control device configured to control the functioning thereof, possibly when installed therein.

Embodiments of the first aspect may comprise at least one feature from the following bulleted list or any combination of the following features:

- at least a part of the primary set of TCI states is different compared to the secondary set of TCI states:
- the secondary set of TCI states is not to be used to receive data by the user equipment before receiving the mobility trigger;
- the primary set of TCI states and the secondary set of TCI states are not to be used at the same time;
- the same index is associated with the first TRP and the second TRP;
- the index is a control resource set pool index which is used to differentiate a set of control resources used by the first TRP and a third TRP;
- receiving, by the first user equipment, a parameter in downlink control information, wherein the parameter is related to the mobility trigger when the secondary set of TCI states is activated and determining that the secondary set of TCI states is activated and that the mobility trigger is received based on the parameter;
- setting, by the user equipment, the primary set of TCI states as a new secondary set of TCI states and the secondary set of TCI states as a new primary set of TCI states upon receiving the mobility trigger, wherein the new primary and the new secondary sets are associated with the index;
- receiving from a third TRP, by the user equipment, an indication of a primary set of TCI states associated with another index and configuring a receiver of the user equipment to receive data from the first TRP in accordance with the primary set of TCI states associated with the index and to receive data from the third TRP in accordance with said another index before receiving the mobility trigger;
- configuring a receiver of the user equipment to receive data from the second TRP in accordance with the secondary set of TCI states associated with the index and data from the third TRP in accordance with said another index after receiving the mobility trigger;
- configuring the receiver of the user equipment to receive data from the second TRP in accordance with the secondary set of TCI states after a time offset upon receiving the mobility trigger, wherein the time offset is smaller than an activation time offset of a Media Access Control, MAC, -Control Element, CE;
- the mobility trigger is based on explicit or implicit signaling;
- the explicit mobility trigger is based on an information field within downlink control information, the information field being dedicated for mobility trigger indication;
- the implicit mobility trigger is based on another information field received within downlink control information, wherein an indication within said another information field works as the mobility trigger only when there is the secondary set of TCI states;
- the indication within said another information field is a TCI state belonging to the primary set of TCI states and the secondary set of TCI states.

According to a second aspect of the present invention, there is provided a second method comprising transmitting to a user equipment, by a first Transmission and Reception Point, TRP, an indication of a primary set of Transmission Configuration Indication, TCI, states associated with an index and an indication of a secondary set of TCI states associated with the index, wherein the primary set of TCI states is usable for receiving data from the first TRP and the secondary set of TCI states is usable for receiving data from a second TRP, determining that there is a need to switch the user equipment from the first TRP to the second TRP and transmitting a mobility trigger to the user equipment, to configure a receiver of the user equipment to receive data from the second TRP in accordance with the secondary set of TCI states upon receiving the mobility trigger. The second method may be performed by a TRP, or a control device configured to control the functioning thereof, possibly when installed therein.

Embodiments of the second aspect may comprise at least one feature from the following bulleted list or any combination of the following features:

- at least a part of the primary set of TCI states is different compared to the secondary set of TCI states;
- the secondary set of TCI states is not to be used to receive data by the user equipment before receiving the mobility trigger;
- the primary set of TCI states and the secondary set of TCI states are not to be used at the same time;
- the same index is associated with the first TRP and the second TRP;
- the index is a control resource set pool index which is used to differentiate a set of control resources used by the first TRP and a third TRP;
- transmitting, by the first TRP, a parameter in downlink control information to the user equipment, wherein the parameter is related to the mobility trigger when the secondary set of TCI indication states is activated;
- the mobility trigger is based on explicit or implicit signaling;
- the explicit mobility trigger is based on an information field within downlink control information, the information field being dedicated for mobility trigger indication;
- the implicit mobility trigger is based on another information field received within downlink control information, wherein an indication within said another information field works as the mobility trigger only when there is the secondary set of TCI states;
- the indication within said another information field is a TCI state belonging to the primary set of TCI states and the secondary set of TCI states.

According to a third aspect of the present invention, there is provided an apparatus comprising at least one processing core, at least one memory including computer program code, the at least one memory and the computer program code being configured to, with the at least one processing core, cause the apparatus at least to perform the first method. The at least one memory and the computer program code may be configured to, with the at least one processing core, cause the apparatus at least to perform, receive from a first Transmission and Reception Point, by a user equipment, an indication of a primary set of Transmission Configuration Indication, TCI, states associated with an index and an indication of a secondary set of TCI states associated with the index, wherein the primary set of TCI states is usable for receiving data from the first TRP and the secondary set of TCI states is usable for receiving data from a second TRP, configure a receiver of the user equipment to receive data from the first TRP in accordance with the primary set of TCI states and receive, by the user equipment, a mobility trigger and configure the receiver of the user equipment to receive data from the second TRP in accordance with the secondary set of TCI states upon receiving the mobility trigger. The apparatus of the third aspect may be a user equipment, or a control device configured to control the functioning thereof, possibly when installed therein.

According to a fourth aspect of the present invention, there is provided an apparatus comprising at least one processing core, at least one memory including computer program code, the at least one memory and the computer program code being configured to, with the at least one processing core, cause the apparatus at least to perform the second method. The at least one memory and the computer program code may be configured to, with the at least one processing core, cause the apparatus at least to perform, transmit to a user equipment, by a first Transmission and Reception Point, TRP, an indication of a primary set of Transmission Configuration Indication, TCI, states associated with an index and an indication of a secondary set of TCI states associated with the index, wherein the primary set of TCI states is usable for receiving data from the first TRP and the secondary set of TCI states is usable for receiving data from a second TRP, determine that there is a need to switch the user equipment from the first TRP to the second TRP and transmit a mobility trigger to the user equipment, to configure a receiver of the user equipment to receive data from the second TRP in accordance with the secondary set of TCI states upon receiving the mobility trigger. The apparatus of the fourth aspect may be a TRP, or a control device configured to control the functioning thereof, possibly when installed therein.

According to a fifth aspect of the present invention, there is provided an apparatus comprising means for performing the first method. The apparatus may comprise means for receiving from a first Transmission and Reception Point, by a user equipment, an indication of a primary set of Transmission Configuration Indication, TCI, states associated with an index and an indication of a secondary set of TCI states associated with the index, wherein the primary set of TCI states is usable for receiving data from the first TRP and the secondary set of TCI states is usable for receiving data from a second TRP, means for configuring a receiver of the user equipment to receive data from the first TRP in accordance with the primary set of TCI states and means for receiving, by the user equipment, a mobility trigger and means for configuring the receiver of the user equipment to receive data from the second TRP in accordance with the secondary set of TCI states upon receiving the mobility trigger. The apparatus of the fifth aspect may be a user equipment, or a control device configured to control the functioning thereof, possibly when installed therein.

According to a sixth aspect of the present invention, there is provided an apparatus comprising means for performing the second method. The apparatus may comprise means for transmitting to a user equipment, by a first Transmission and Reception Point, TRP, an indication of a primary set of Transmission Configuration Indication, TCI, states associated with an index and an indication of a secondary set of TCI states associated with the index, wherein the primary set of TCI states is usable for receiving data from the first TRP and the secondary set of TCI states is usable for receiving data from a second TRP, means for determining that there is a need to switch the user equipment from the first TRP to the second TRP and means for transmitting a mobility trigger to the user equipment, to configure a receiver of the user equipment to receive data from the second TRP in accordance with the secondary set of TCI states upon receiving the mobility trigger. The apparatus of the sixth aspect may be a TRP, or a control device configured to control the functioning thereof, possibly when installed therein.

According to a seventh aspect of the present invention, there is provided a non-transitory computer readable medium having stored thereon a set of computer readable instructions that, when executed by at least one processor, cause an apparatus to at least perform the first method. According to an eighth aspect of the present invention, there is provided a non-transitory computer readable medium having stored thereon a set of computer readable instructions that, when executed by at least one processor, cause an apparatus to at least perform the second method.

According to a ninth aspect of the present invention, there is provided a computer program configured to perform the first method. According to a tenth aspect of the present invention, there is provided a computer program configured to perform the second method.

EMBODIMENTS

The procedures described herein provide mobility improvements for wireless communication networks. More specifically, embodiments of the present invention provide seamless connectivity for mobile User Equipments, UEs. A UE may receive from a first Transmission and Reception Point, TRP, indications of at least two sets of Transmission Configuration Indication, TCI, states. The at least two sets of TCI states may be associated with the same Control Resource Set, CORESET, pool index (CORESETPoolIndex) and comprise a primary set and a secondary set of TCI states. The CORESET pool index (CORESETPoolIndex) may be referred to as an index in general. The UE may then first use the primary set of TCI states for reception of data from the first TRP and the secondary set of TCI states may be used afterwards, for reception of data from a second TRP upon receiving a mobility trigger, wherein the mobility trigger may indicate for example that the UE should switch from the first TRP to the second TRP.

Figure 1:
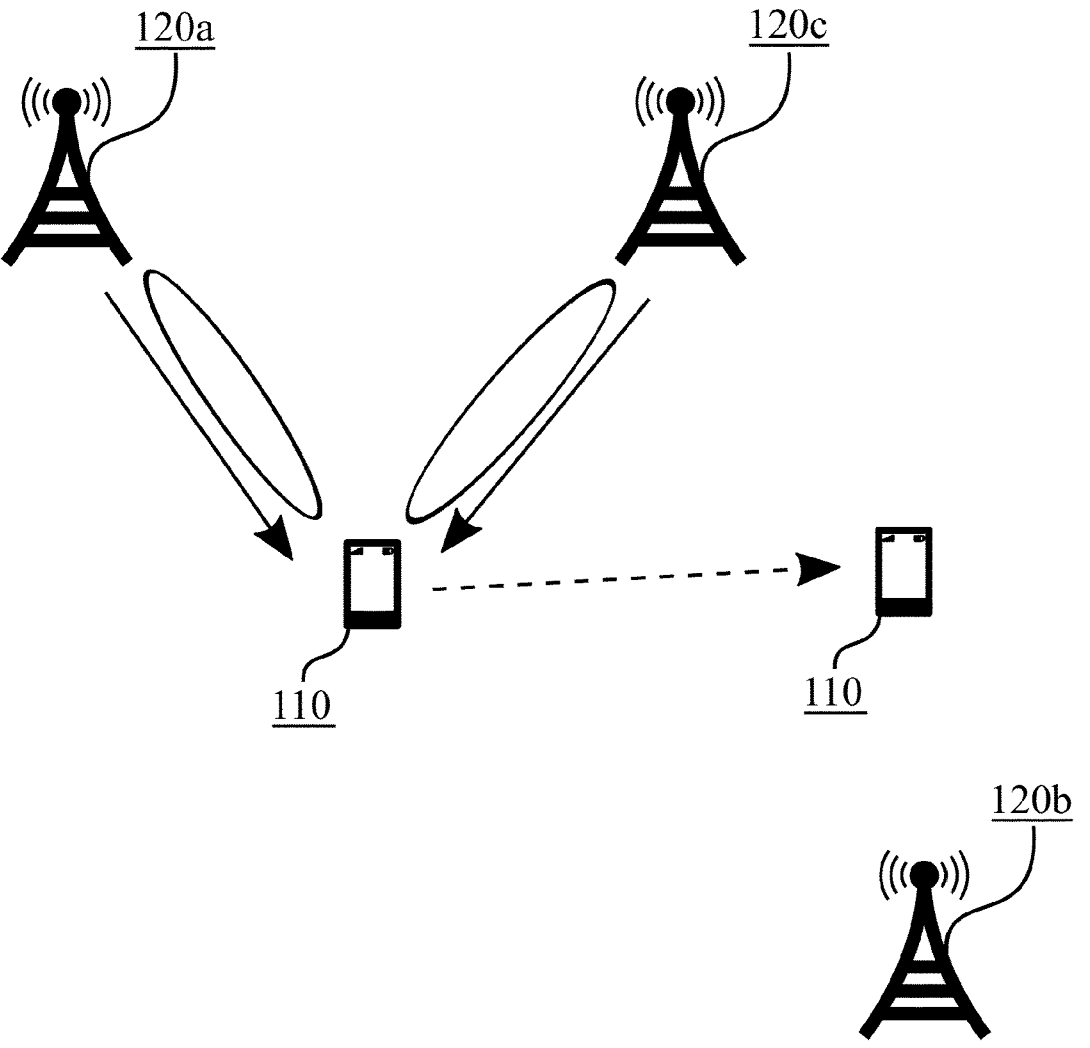
FIG. 1 illustrates an exemplary network scenario in accordance with at least some embodiments.

FIG. 1 illustrates an exemplary network scenario in accordance with at least some embodiments. According to the exemplary network scenario of FIG. 1, there may be a cellular communication system, which comprises one or more UEs 110 and three TRPs 120*a-c*. In some embodiments, TRP 120*a* may be referred to as a first TRP, TRP 120*b* may be referred to as a second TRP and TRP 120*c* may be referred to as a third TRP. UE 110 may comprise, for example, a smartphone, a cellular phone, a Machine-to-Machine, M2M, node, Machine-Type Communications, MTC, node, an Internet of Things, IoT, node, a car telemetry unit, a laptop computer, a tablet computer or, indeed, any kind of suitable UE, such as a Customer Premises Equipment, CPE.

UE 110 may be connected to TRPs 120*a-c* via air interface using beams. That is to say, the cellular communication network may be a beam-based system. In some embodiments, UE 110 and TRPs 120*a-c* may be multi-panel devices comprising multiple panels or subpanels with independent transmitter/receiver chains and each panel or subpanel may be used to transmit one or more beams at a time. Air interface between UE 110 and TRPs 120*a-c* may be configured in accordance with a Radio Access Technology, RAT, which UE 110 and TRPs 120*a-c* are configured to support. Examples of cellular RATs include Long Term Evolution, LTE, New Radio, NR, which may also be known as fifth generation, 5G, radio access technology and MulteFire. In any case, embodiments of the present invention are not restricted to any particular wireless technology. Instead, embodiments of the present invention may be exploited in any communication network, wherein mobility improvements are needed.

TRPs 120*a-c* may be connected, directly or via at least one intermediate node, with a core network (not shown in FIG. 1) via one or more interfaces. The core network may be, in turn, coupled via interface(s) with another network, via which connectivity to further networks may be obtained, for example via a worldwide interconnection network. TRPs 120*a-c* may be connected with each other as well via an inter-TRP interface (not shown in FIG. 1), even though in some embodiments the inter-TRP interface may be absent. TRPs 120*a-c* may be connected with each other via a non-ideal backhaul for example.

In the exemplary network scenario of FIG. 1, UE 110 may receive data from first TRP 120*a*, such as a first Physical Downlink Shared Channel, PDSCH, transmission. UE 110 may receive a downlink control information transmission from first TRP 120*a* as well, such as a first Physical Downlink Control Channel, PDCCH, transmission. However, at some point UE 110 may move away from first TRP 120*a*, as shown by the dashed line in FIG. 1, towards second TRP 120*b* so that UE 110 cannot receive transmissions from first TRP 120*a* anymore. Thus, UE 110 may need to be switched to second TRP 120*b* to receive data, and possibly downlink control information transmissions as well, from second TRP 120*b*. Seamless connectivity should be ensured in such an example case. Embodiments of the present invention therefore address this issue and provide improvements for mobility.

In some embodiments, UE 110 may also receive data from third TRP 120*c*, such as a second PDSCH transmission while receiving data from first TRP 120*a*. UE 110 may receive a downlink control information transmission from third TRP 120*c* as well, such as a second PDCCH transmission while receiving a downlink control information transmission from first TRP 120*a*. In such a scenario, it should also be ensured that UE 110 may still receive data, and possibly downlink control information transmissions as well, from third TRP 120*c* after switching to second TRP 120*b* from first TRP 120*a*.

As an example, a multi-Downlink Control Information, DCI, multi-TRP framework may be extended for handling intra/inter-cell mobility scenario. For example, if UE 110 is moving fast, the serving TRP may be required to change more dynamically, from first TRP 120*a* to second TRP 120*b*. However, in the existing multi-TRP framework only two CORESET groups can be configured via a CORESETPoolIndex and TCI state activation is done per CORESETPoolIndex. Downlink control information transmissions, such as PDDCHs, are sent separately per TRP and the TCI state indicated to UE 110 is often, but not always, associated with the same TRP. Coordination between TRPs may not be possible for example in case of a non-ideal backhaul between TRPs.

Also, if the network decides to support UE 110 with second TRP 120*b* instead of first TRP 120*a*, e.g., to enable switching of UE 110 from first TRP 120*a* to second TRP 120*b*, the network typically requires updating activated TCI states for the CORESETPoolIndex associated with first TRP 120*a*. As Medium Access Control, MAC, —Control Element, CE, has inevitable delays from the indication of the command to the actual changes to take place, there is a certain time duration when UE 110 is not supported by multiple TRPs. In another situation, both TRPs 120*a* and 120*c* may be switched to two different TRPs, and during the transient period, UE 110 may not be able to receive data transmission without improvements.

Embodiments of the present invention therefore facilitate more efficient (lower latency and overhead) downlink/uplink beam management to support higher intra/inter-cell layer1/2-centric mobility and/or a larger number of configured TCI states. Moreover, Quasi Co-Location, QCL, and TCI-related enhancements are provided to enable inter-cell multi-TRP operations, e.g., assuming multi-DCI based multi-PDSCH reception.

QCL indication functionality may be exploited for beam management. Two antenna ports may be considered as QCL'ed if properties of a channel over which a symbol is transmitted via a first antenna port can be derived from channel over which a symbol is transmitted via a second antenna port. Regarding downlink beam indication, QCL indication functionality may be defined as follows. The principle to receive a certain physical signal or physical channel may be that UE 110 is either configured with or UE 110 implicitly determines a source/reference signal that UE 110 has received and measured earlier which defines how to set a receiver beam of UE 110 for the reception of the downlink (target) physical signal or channel to be received. To provide UE 110 with QCL characteristics for the target signal (to be received) a TCI framework may be used.

According to the TCI framework UE 110 may be configured with TCI state(s) to provide UE 110 with source RS(s) for determining QCL characteristics. Each TCI state may include for example one or two source RSs that provide UE QCL TypeA, TypeB, TypeC and/or TypeD parameters, e.g., as follows:

QCL-TypeA: {Doppler shift, Doppler spread, average delay, delay spread}.

QCL-TypeB: {Doppler shift, Doppler spread}

QCL-TypeC: {Doppler shift, average delay}

QCL-TypeD: {Spatial Rx parameter}

Indications of TCI states may be transmitted to UE 110 in a downlink control message for example, the downlink control message comprising configurations such as QCL-relationships between the downlink RSs in one Channel State Information-Reference Signal, CSI-RS, set and PDSCH Demodulation Reference Signal, DMRS, ports. For instance, UE 110 may be configured with multiple TCI state configurations and each TCI state may contain parameters for configuring a QCL relationship between one or two downlink reference signals.

Embodiments of the present invention provide seamless connectivity by introducing a secondary set of TCI states that can be activated for UE 110, on top of a primary set of TCI states, for example to be used in a situation where layer 1/2-centric mobility trigger is received at UE 110. In some embodiments, at least a part of the secondary set of TCI states that are activated can be different compared to the primary set of TCI states that are activated, e.g., for a given higher layer parameter CORESETPoolIndex which may be used to separate CORESETs for TRPs. That is to say, the primary and the secondary sets of TCI states may be associated with the same CORESETPoolIndex, but for reception of transmissions from different TRPs.

In some embodiments, there may be one or two sets of activated secondary TCI states. However, only one secondary set of activated TCI states can be associated with the one CORESETPoolIndex, i.e., another secondary set of activated TCI states should then be associated with another CORESETPoolIndex. That is to say, a given TRP index may refer to one primary and one secondary set of activated TCI states.

In some embodiments, a control element command, such as a MAC-CE command, may be used to activate or to modify the secondary set of TCI states. For instance, a new MAC-CE or existing MAC-CE commands in Rel-16 with different interpretation may be used to activate the secondary set of TCI states.

The secondary set of activated TCI states may be used instead of the primary set of activated TCI states after receiving a mobility trigger by UE 110. The mobility trigger may be associated with a given CORESETPoolIndex as well. However, the secondary set of activated TCI states may not be used by UE 110 for data reception unless, or before, the mobility trigger is received at UE 110. The mobility trigger may be a layer 1/2-centric mobility trigger for example. As the mobility trigger is associated with the CORESETPoolIndex, the mobility trigger may be only valid to a given set of activated TCI states which are associated with the CORESETPoolIndex.

The mobility trigger may be implicit or explicit. In case of an implicit mobility trigger, the network may indicate a parameter for example in the DCI associated with the CORESETPoolIndex. The parameter may be related to the mobility trigger if there is an additional set of TCI states, i.e., the secondary set of TCI states is activated. That is to say, UE 110 may receive the parameter in the DCI from first TRP 120*a*, wherein the parameter is related to the mobility trigger when the secondary set of TCI states is activated, and determine based on the parameter that the mobility trigger is received. If there is no additional set of TCI states, the indicated parameter may still have a valid UE behaviour other than mobility trigger. For instance, if there is no additional, secondary set of TCI states, the DCI may indicate a certain "TCI state X" in TCI codepoint and UE 110 may only receive a data transmission from the same TCI state. In case of an explicit trigger, the network may indicate the mobility trigger as a field in DCI or as a separate DCI format or as any other dynamic signal.

In some embodiments, UE 110 may, after receiving the mobility trigger associated with the CORESETPoolIndex, use the secondary set of activated TCI states as the primary set of TCI states for the same CORESETPoolIndex following a given time offset. The time offset may be smaller than an activation time offset of a MAC-CE. Alternatively, UE 110 may use the secondary set of activated TCI states as the primary set of TCI states for the same CORESETPoolIndex immediately, or as soon as possible, after reception of the mobility trigger.

In some embodiments, TCI codepoints indicated, for example in a DCI, corresponding to a given CORESETPoolIndex may refer to the updated, secondary set of TCI states after receiving the mobility trigger. TCI codepoint may be the DCI field (e.g., maximum 8 code points/3 bits for this in DCI) used to indicate one out of eight (max) TCI states activated at UE 110. The secondary set of TCI states may become the new primary set after receiving the mobility trigger. Then, the mapping between the DCI field and TCI states may follow the secondary set of TCI states.

In some embodiments, the earlier primary set of activated set of TCI states may be used as the secondary set of activated TCI states until a further activation command is received to update the secondary set of TCI states. That is to say, UE 110 may set the primary set of TCI states as a new secondary set of TCI states and the secondary set of TCI states as a new primary set of TCI states after receiving the mobility trigger, wherein the new primary and secondary sets are associated with the CORESETPoolIndex as well.

Figure 2:
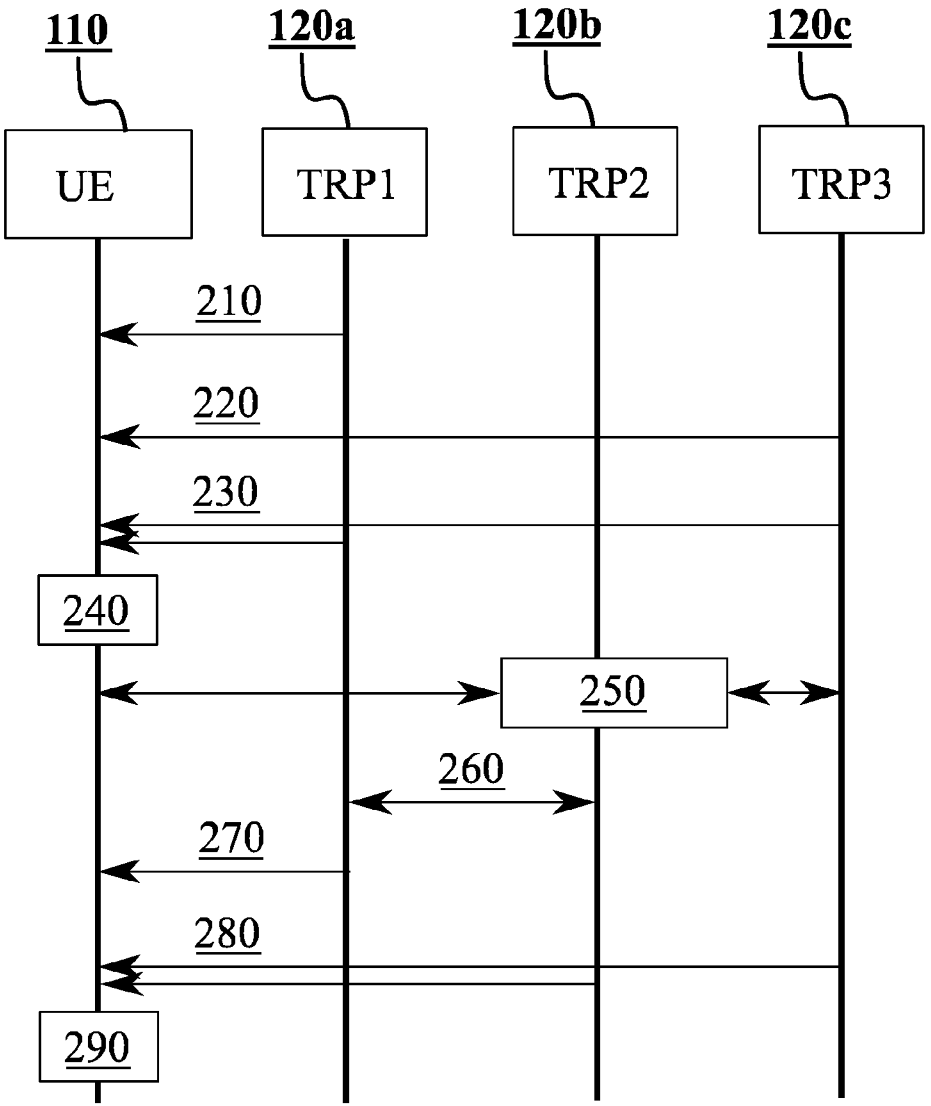
FIG. 2 illustrates a signalling diagram in accordance with at least some embodiments.

FIG. 2 illustrates a signalling diagram in accordance with at least some embodiments. On the vertical axes are disposed, from the left to the right, UE 110 and TRPs 120*a-c* of FIG. 1. Time advances from the top towards the bottom.

At step 210, first TRP 120*a* may activate a primary set of TCI states and a secondary set of TCI states associated with the same CORESETPoolIndex (e.g., CORESETPoolIndex=0). First TRP 120*a* may activate the sets by transmitting an indication of the primary and secondary sets of TCI states associated with the same CORESETPoolIndex to UE 110. The primary set of TCI states may be usable for receiving data from first TRP 120*a* and the secondary set of TCI states may be usable for receiving data from second TRP 120*b*. First TRP 120*a* may activate the sets by transmitting a MAC-CE comprising indications of said primary and secondary sets.

That is to say, first TRP 120*a* may use the same value for CORESETPoolIndex, i.e., the primary set and secondary sets of TCI states may be associated with the same CORESETPoolIndex. In general, a CORESETPoolIndex may indicate a set of control resources (physical resources, such a downlink resource grid, and a set of parameters) that are, or will be, used for downlink control information transmissions (PDCCH/DCI). Hence, for example the primary set of TCI states associated with the CORESETPoolIndex=0 may be used by UE 110 to receive downlink control information transmissions from first TRP 120*a* and the secondary set of TCI states associated with CORESETPoolIndex=0 may be used by UE 110 to receive downlink control information transmissions from second TRP 120*b* after switching UE 110 from first TRP 120*a* to second TRP 120*b*.

So at step 210 UE 110 may receive the indication of the primary set of TCI states associated with the CORESETPoolIndex and the indication of a secondary set of TCI states associated with the CORESETPoolIndex as well. Upon receiving the primary and the secondary sets of TCI states, UE 110 may configure its receiver to receive data from first TRP 120*a* in accordance with the primary set of TCI states and receive said data if/when transmitted by first TRP 120*a*.

In some embodiments, the primary set of TCI states may be different compared to the secondary set of TCI states, at least partly. However, the secondary set of TCI states may not be used to receive data by UE 110 before receiving a mobility trigger from first TRP 120*a*. The primary set of TCI states and the secondary set of TCI states may not be used by UE 110 at the same time either.

At step 220, third TRP 120*c* may also activate and transmit an indication of another primary set of TCI states associated with third TRP 120*b* for example by transmitting a MAC-CE comprising the indication of said primary set. So at step UE 110 may receive the primary set associated with another CORESETPoolIndex, such as CORESETPoolIndex=1, from third TRP 120*c*. Upon receiving, the primary set of TCI states from third TRP 120*c*, UE 110 may configure its receiver to receive data in accordance with the primary set of TCI states associated with the CORESETPoolIndex and to receive data in accordance with said another CORESETPoolIndex before receiving the mobility trigger. That is to say, UE 110 may be at the same time configured to receive data from first TRP 120*a* and third TRP 120*c*. In some embodiments, capability of UE 110 of the number of activated TCI states may be limited, which may be maintained as an upper limit across all TRPs.

At step 230, first TRP 120*a* and third TRP 120*c* may transmit data to UE 110. In some embodiments, multi-DCI based multi-TRP operation may be used such that each DCI indicates one TCI state from the primary set of activated TCI states that correspond to the same CORESETPoolindex.

At step 240, UE may use the primary set of TCI states of first TRP 120*a* and third TRP 120*c* to receive data, i.e., receive data in accordance with the primary sets of TCI states associated with the CORESETPoolIndex (CORESETPoolIndex=0) from first TRP 120*a* and said another CORESETPoolIndex (CORESETPoolIndex=1) from third TRP 120*c*. UE 110 may thus receive data transmissions from two TRPs. For receiving data from first TRP 120*a*, UE 110 may map an indicated TCI codepoint to the primary set of activated TCI states corresponding to the CORESETPoolIndex=0. Similarly, for receiving data from third TRP 120*c*, UE 110 may map an indicated TCI codepoint corresponding to CORESETPoolIndex=1. That is to say, UE 110 may derive, from the primary set of TCI states associated with the CORESETPoolIndex, a QCL assumption for receiving transmissions from first TRP 120*a* and receive the transmissions according to the derived QCL assumption. Similarly, UE 110 may derive, from the primary set of TCI states associated with said another CORESETPoolIndex, a QCL assumption for receiving transmissions from third TRP 120*c* and receive the transmissions according to the derived QCL assumption.

At step 250, measurements, such as SSB/CSI measurements, and reporting may be performed by UE 110 for all TRPs 120*a-c*, i.e., corresponding to all TRPs that are associated with the mobility. It should be noted that step 250 may occur at any stage of the signalling diagram. However, UE 110 may not be required to have mobility measurements related to layer 3, and layer 1 measurements can be used for layer 1/2 centric mobility.

At step 260, the network may use measurement reports, HARQ-ACK error reports, location information of UE 110, or any other relevant information to predict movement of UE 110 and to decide the requirement for switching the serving TRP from first TRP 120*a* to second TRP 120*b*, wherein both first TRP 120*a* and second TRP 120*b* use the same CORESETPoolIndex (CORESETPoolIndex). That is to say, based on the reported measurements and/or other information, for example first TRP 120*a*, or a device controlling first TRP 120*a*, may determine at step 260 that there is a need to switch UE 110 from first TRP 120*a* to second TRP 120*b*.

At step 270, UE 110 may receive a mobility trigger from first TRP 120*a*. The mobility trigger may for example indicate switching the serving TRP of UE 110, from first TRP 120*a* to second TRP 120*b*. Consequently, UE 110 may swap the primary and secondary sets of activated TCI states associated with the CORESETPoolIndex. That is to say, UE 110 may set the primary set of TCI states as a new secondary set of TCI states and the secondary set of TCI states as a new primary set of TCI states upon receiving the mobility trigger, wherein the new primary and the new secondary sets are associated with the CORESETPoolIndex as well. Hence the secondary set of activated TCI states (the new primary set of TCI states) may be used to interpret DCI indication of the codepoint after receiving the mobility trigger. UE 110 may configure the receiver of UE 110 to receive data from second TRP 120$b$ in accordance with the secondary set (new primary set) of TCI states upon receiving the mobility trigger from first TRP 120$a$.

At step 280, UE 110 may receive data transmissions from second TRP 120$b$ and third TRP 120$c$, but first TRP 120$a$ may have ceased its transmissions. So UE 110 may receive data in accordance with the secondary set of TCI states associated with the CORESETPpoolIndex (CORESETPoolIndex=0) and said another CORESETPoolIndex (CORESETPoolIndex=1) after receiving the mobility trigger.

At step 290, UE may use the new primary set (earlier secondary set) of TCI states of second TRP 120$a$ and the primary set of TCI states of third TRP 120$c$ (the CORESETPoolIndex and another CORESETPoolIndex, respectively) to receive data. For receiving data from second TRP 120$b$, UE 110 may map an indicated TCI codepoint to the new primary set (earlier secondary set) of activated TCI states corresponding to the CORESETPoolIndex=0. Similarly, for receiving data from third TRP 120$c$, UE 110 may map an indicated TCI codepoint corresponding to CORESETPoolIndex=1

That is to say, UE 110 may derive, from the new primary set (earlier secondary set) of TCI states associated with the CORESETPoolIndex, a QCL assumption for receiving transmissions from second TRP 120$b$ and receive the transmissions according to the derived QCL assumption. Similarly, UE 110 may derive, from the primary set of TCI states associated with said another CORESETPoolIndex, a QCL assumption for receiving transmissions from third TRP 120$c$ and receive the transmissions according to the derived QCL assumption.

Figure 3:
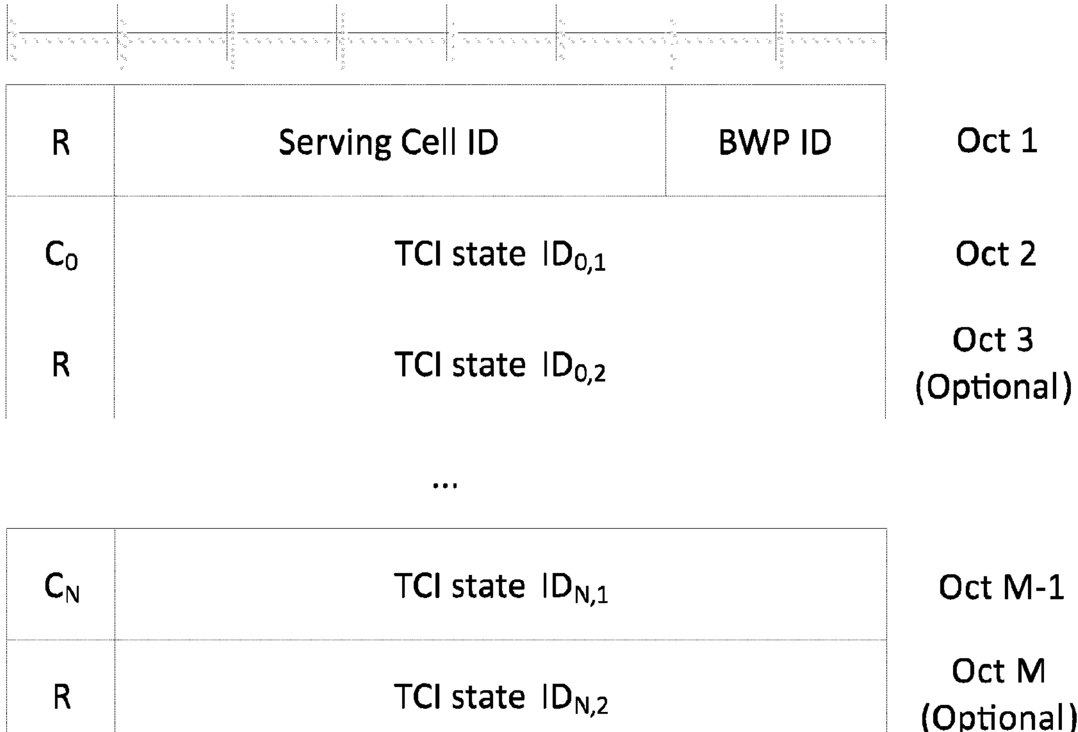
FIG. 3 illustrates a control element in accordance with at least some embodiments.

FIG. 3 illustrates a control element in accordance with at least some embodiments. More specifically, FIG. 3 illustrates enhanced TCI states activation/deactivation for example for a UE-specific PDSCH MAC CE. Primary and secondary sets of TCI states may be activated by transmitting the control element of FIG. 3, i.e., the control element of FIG. 3 may comprise indications about the primary and secondary sets of TCI states.

As an example, if the multi-DCI based multi-TRP operation is used for UE 110, there may be two different values for CORESETPoolIndex. In such cases, each TRP may transmit a control element command, such as a MAC-CE command, which comprises CORESETPoolIndex used to activate the primary set of TCI states for a given TRP. The secondary set of TCI states associated with the same CORESETPoolIndex may be activated by transmitting the control element command used for a single-DCI based multi-TRP scheme. In other words, the control element command shown in FIG. 3 may be used for a single DCI based multi-TRP scheme. The control element of FIG. 3 comprises the following fields:

Serving Cell Identity, ID: This field may indicate an identity of a serving cell UE 110. The control element applies for the serving cell. The length of the field may be for example 5 bits;

Bandwidth Part, BWP, ID: This field may indicate a downlink BWP for which the control element applies as the codepoint of the DCI bandwidth part indicator field, for example as specified in TS 38.212 [9]. The length of the BWP ID field may be 2 bits;

$C_i$: This field may indicate whether an octet containing TCI state $ID_{i,2}$ is present. If this field is set to "1", the octet containing TCI state $ID_{i,2}$ is present. If this field is set to "0", the octet containing TCI state $ID_{i,2}$ is not present;

TCI state $ID_{i,j}$: This field indicates the TCI state identified by TCI-StateId, for example as specified in TS 38.331 [5], where i may be the index of the codepoint of the DCI TCI field as specified in TS 38.212 [9] and TCI state $ID_{ij}$ denotes the $j^{th}$ TCI state indicated for the $i^{th}$ codepoint in the DCI TCI field. The TCI codepoint to which the TCI States are mapped is determined by its ordinal position among all the TCI codepoints with sets of TCI state $ID_{i,j}$ fields, i.e., the first TCI codepoint with TCI state $ID_{0,1}$ and TCI state $ID_{0,2}$ shall be mapped to the codepoint value 0, the second TCI codepoint with TCI state $ID_{1,1}$ and TCI state $ID_{1,2}$ shall be mapped to the codepoint value 1 and so on. The TCI state $ID_{i,2}$ may be optional based on the indication of the $C_i$ field. The maximum number of activated TCI codepoints may be 8 and the maximum number of TCI states mapped to a TCI codepoint may be 2.

R: Reserved bit, set to "0".

In some embodiments, the following changes may be applied to determine the secondary set of TCI states using the aforementioned control element command. For instance, one control element, such as a MAC CE, command can activate the secondary set of TCI states associated with both CORESETPoolIndex values. For example, TCI state ID for the first TCI state may be used to activate TCI states for the secondary set of TCI states corresponding to CORESETPoolIndex=0 and the TCI state ID for the second TCI state may be used to activate TCI states for the secondary set of TCI states corresponding to CORESETPoolIndex=1.

Alternatively, one control element, such as a MAC CE, command can activate only one secondary set of TCI states associated with a given CORESETPoolIndex. For example, TCI state ID for the first TCI state may be used to activate TCI states for the secondary set of TCI states for the given CORESETPoolIndex, where CORESETPoolIndex may be indicated using the reserved bit (of Rel-16 MAC-CE command for example).

In some embodiments, an implicit mobility trigger may be used to activate the secondary TCI states. As an example, the mobility trigger used to switch from the primary set of TCI states to the secondary set of TCI states can be a TCI state activated in the list of TCI states activated within the primary set of TCI states.

For instance, for both intra- and inter-cell mobility, a certain TCI state "TCI state X" may be activated in both primary and secondary sets of TCI states. In general, TCI states activated per TRP (CORESETPoolIndex) may be different compared to another TRP. That is to say, the primary set of TCI states associated with the CORESETPoolIndex (CORESETPoolIndex=0) to be used to receive data from first TRP 120$a$ may be, at least partly, different compared to the secondary set of TCI states associated with another CORESETPoolIndex (CORESETPoolIndex=1) to be used to receive data from second TRP 120$b$. However, if there is one, certain "TCI state X" activated for both serving TRP (first TRP 120$a$) and the new TRP (second TRP 120$b$), downlink control information may indicate said certain "TCI state X" in TCI codepoint. In such a case UE 110 may activate the secondary set of TCI states in addition to receiving data from the new TRP (second TRP 120$b$). Moreover, if there is more than one TCI state associated with both TRPs (the same CORESETPoolIndex), the trigger "TCI state X" may be the first or the last codepoint. So the implicit mobility trigger may be based on another information field received within downlink control information, wherein an indication within said another information field works as the mobility trigger only when there is the secondary set of TCI states. The indication within said another information field may be a TCI state belonging to the primary set of TCI states and the secondary set of TCI states.

Alternatively, for example for inter-cell mobility, a TCI state that is associated with another Physical Cell Identifier, PCI, (such as a PCI of second TRP 120*b*) than the PCI of serving TRP (such as a PCI of first TRP 120*a*) may be used as the mobility trigger. So if UE 110 receives a TCI state, e.g., via DCI, wherein the TCI state is associated with said another PCI, the secondary set of TCI states may get activated, wherein the secondary set of TCI states may also relate to said another PCI. In other words, the TCI with different PCI than the PCI of the serving TRP may be used as the mobility trigger.

In some embodiments, seamless monitoring of DCI is also provided. For example in multi-TRP scenarios it is possible to have more than 3 CORESETs for UE 110 and CORESETs may be divided between two TRPs. TCI states for the CORESETs may be activated separately from one another. Therefore, it is possible that two CORESETs within the same CORESETPoolIndex use different TCI states (e.g., one corresponding to first TRP 120*a* and another for second TRP 120*b*) such that after receiving the mobility trigger UE 110 may still monitor DCI using a CORESET. Meanwhile, other CORESETs associated with first TRP 120*a* can be separately activated with TCI states corresponding to second TRP 120*b*.

Embodiments of the present invention therefore provide seamless connectivity for UE 110 without layer 3 impact via multiple TRPs such that intra- and inter-cell multi-TRP framework is reused. Embodiments of the present invention are suitable at least for high mobility scenario, wherein the delay on MAC-CE activation may be a significant issue with traditional TCI update commands. Moreover, complicated handover process is not needed because of the use of layer 1 triggers for mobility. Changes to 3GPP specifications may be minimal. Embodiments of the present invention also allow additional reliability by having multiple connections to UE 110 all the time.

Figure 4:
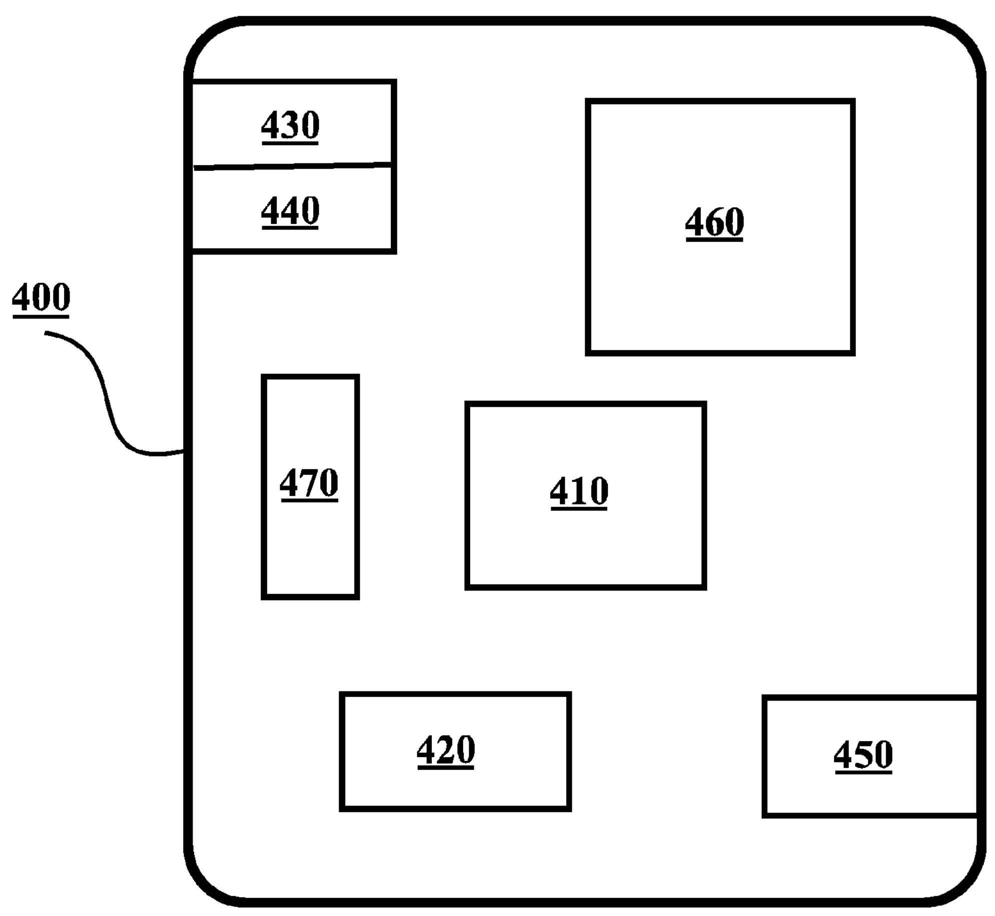
FIG. 4 illustrates an example apparatus capable of supporting at least some embodiments.

FIG. 4 illustrates an example apparatus capable of supporting at least some embodiments. Illustrated is device 400, which may comprise, for example, UE 110 or TRP 120, or a device controlling functioning thereof. Comprised in device 400 is processor 410, which may comprise, for example, a single- or multi-core processor wherein a single-core processor comprises one processing core and a multi-core processor comprises more than one processing core. Processor 410 may comprise, in general, a control device. Processor 410 may comprise more than one processor. Processor 410 may be a control device. A processing core may comprise, for example, a Cortex-A8 processing core manufactured by ARM Holdings or a Steamroller processing core produced by Advanced Micro Devices Corporation. Processor 410 may comprise at least one Qualcomm Snapdragon and/or Intel Atom processor. Processor 410 may comprise at least one application-specific integrated circuit, ASIC. Processor 410 may comprise at least one field-programmable gate array, FPGA. Processor 410 may be means for performing method steps in device 400. Processor 410 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Device 400 may comprise memory 420. Memory 420 may comprise random-access memory and/or permanent memory. Memory 420 may comprise at least one RAM chip. Memory 420 may comprise solid-state, magnetic, optical and/or holographic memory, for example. Memory 420 may be at least in part accessible to processor 410. Memory 420 may be at least in part comprised in processor 410. Memory 420 may be means for storing information. Memory 420 may comprise computer instructions that processor 410 is configured to execute. When computer instructions configured to cause processor 410 to perform certain actions are stored in memory 420, and device 400 overall is configured to run under the direction of processor 410 using computer instructions from memory 420, processor 410 and/or its at least one processing core may be considered to be configured to perform said certain actions. Memory 420 may be at least in part comprised in processor 410. Memory 420 may be at least in part external to device 400 but accessible to device 400.

Device 400 may comprise a transmitter 430. Device 400 may comprise a receiver 440. Transmitter 430 and receiver 440 may be configured to transmit and receive, respectively, information in accordance with at least one cellular or non-cellular standard. Transmitter 430 may comprise more than one transmitter. Receiver 440 may comprise more than one receiver. Transmitter 430 and/or receiver 440 may be configured to operate in accordance with Global System for Mobile communication, GSM, Wideband Code Division Multiple Access, WCDMA, 5G, Long Term Evolution, LTE, IS-95, Wireless Local Area Network, WLAN, Ethernet and/or Worldwide Interoperability for Microwave Access, WiMAX, standards, for example.

Device 400 may comprise a Near-Field Communication, NFC, transceiver 450. NFC transceiver 450 may support at least one NFC technology, such as Bluetooth, Wibree or similar technologies.

Device 400 may comprise User Interface, UI, 460. UI 460 may comprise at least one of a display, a keyboard, a touchscreen, a vibrator arranged to signal to a user by causing device 400 to vibrate, a speaker and a microphone. A user may be able to operate device 400 via UI 460, for example to accept incoming telephone calls, to originate telephone calls or video calls, to browse the Internet, to manage digital files stored in memory 420 or on a cloud accessible via transmitter 430 and receiver 440, or via NFC transceiver 450, and/or to play games.

Device 400 may comprise or be arranged to accept a user identity module 470. User identity module 470 may comprise, for example, a Subscriber Identity Module, SIM, card installable in device 400. A user identity module 470 may comprise information identifying a subscription of a user of device 400. A user identity module 470 may comprise cryptographic information usable to verify the identity of a user of device 400 and/or to facilitate encryption of communicated information and billing of the user of device 400 for communication effected via device 400.

Processor 410 may be furnished with a transmitter arranged to output information from processor 410, via electrical leads internal to device 400, to other devices comprised in device 400. Such a transmitter may comprise a serial bus transmitter arranged to, for example, output information via at least one electrical lead to memory 420 for storage therein. Alternatively to a serial bus, the transmitter may comprise a parallel bus transmitter. Likewise processor 410 may comprise a receiver arranged to receive information in processor 410, via electrical leads internal to device 400, from other devices comprised in device 400. Such a receiver may comprise a serial bus receiver arranged to, for example, receive information via at least one electrical lead from receiver 440 for processing in processor 410. Alternatively to a serial bus, the receiver may comprise a parallel bus receiver.

Device 400 may comprise further devices not illustrated in FIG. 4. For example, where device 400 comprises a smartphone, it may comprise at least one digital camera. Some devices 400 may comprise a back-facing camera and a front-facing camera, wherein the back-facing camera may be intended for digital photography and the front-facing camera for video telephony. Device 400 may comprise a fingerprint sensor arranged to authenticate, at least in part, a user of device 400. In some embodiments, device 400 lacks at least one device described above. For example, some devices 400 may lack a NFC transceiver 450 and/or user identity module 470.

Processor 410, memory 420, transmitter 430, receiver 440, NFC transceiver 450, UI 460 and/or user identity module 470 may be interconnected by electrical leads internal to device 400 in a multitude of different ways. For example, each of the aforementioned devices may be separately connected to a master bus internal to device 400, to allow for the devices to exchange information. However, as the skilled person will appreciate, this is only one example and depending on the embodiment various ways of interconnecting at least two of the aforementioned devices may be selected without departing from the scope of the embodiments.

Figure 5:
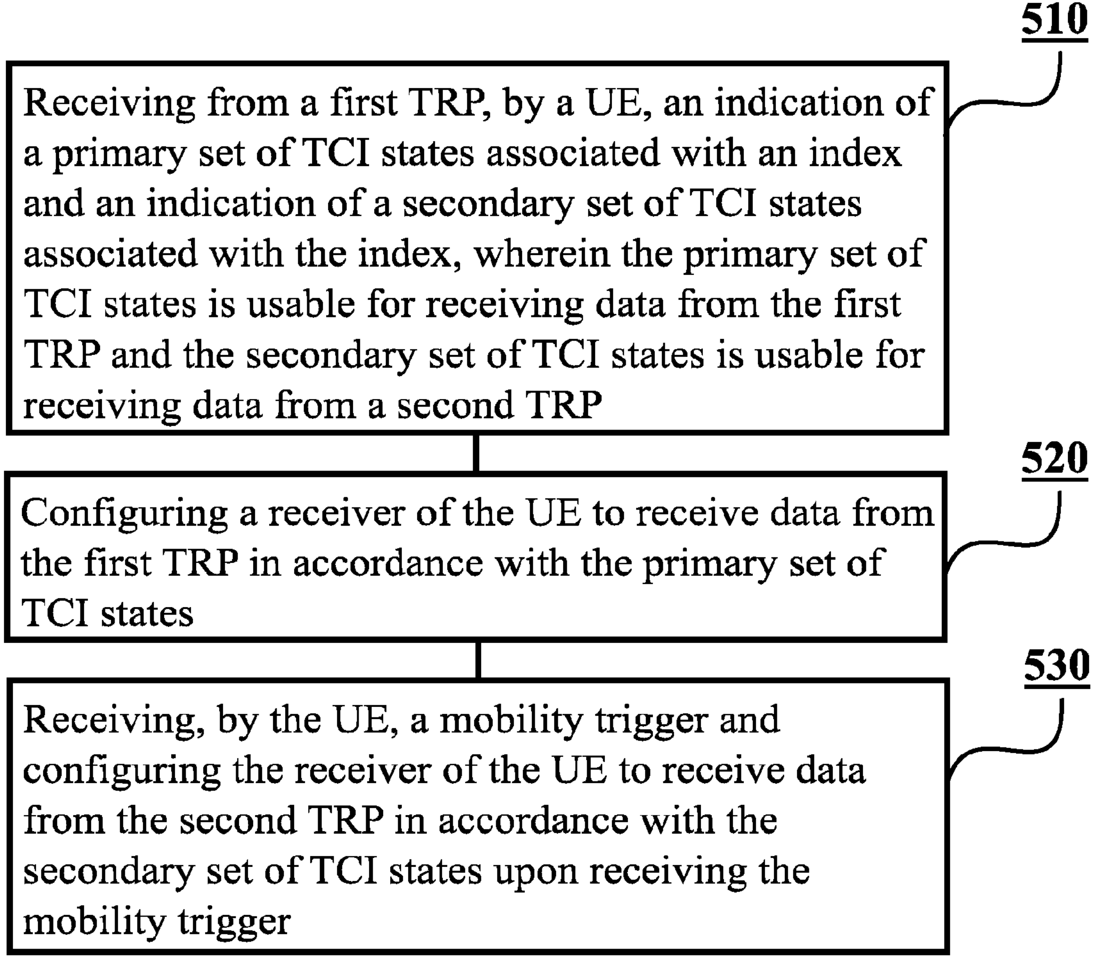
FIG. 5 illustrates a flow graph of a first method in accordance with at least some embodiments.

FIG. 5 is a flow graph of a first method in accordance with at least some embodiments. The phases of the illustrated first method may be performed by UE 110, or by a control device configured to control the functioning thereof, possibly when installed therein.

The first method may comprise, at step 510, receiving from a first TRP, by a UE, an indication of a primary set of TCI states associated with an index and an indication of a secondary set of TCI states associated with the index, wherein the primary set of TCI states is usable for receiving data from the first TRP and the secondary set of TCI states is usable for receiving data from a second TRP. The first method may also comprise, at step 520, configuring a receiver of the UE to receive data from the first TRP in accordance with the primary set of TCI states. Finally, the first method may comprise, at step 530, receiving, by the UE, a mobility trigger and configuring the receiver of the UE to receive data from the second TRP in accordance with the secondary set of TCI states upon receiving the mobility trigger.

Figure 6:
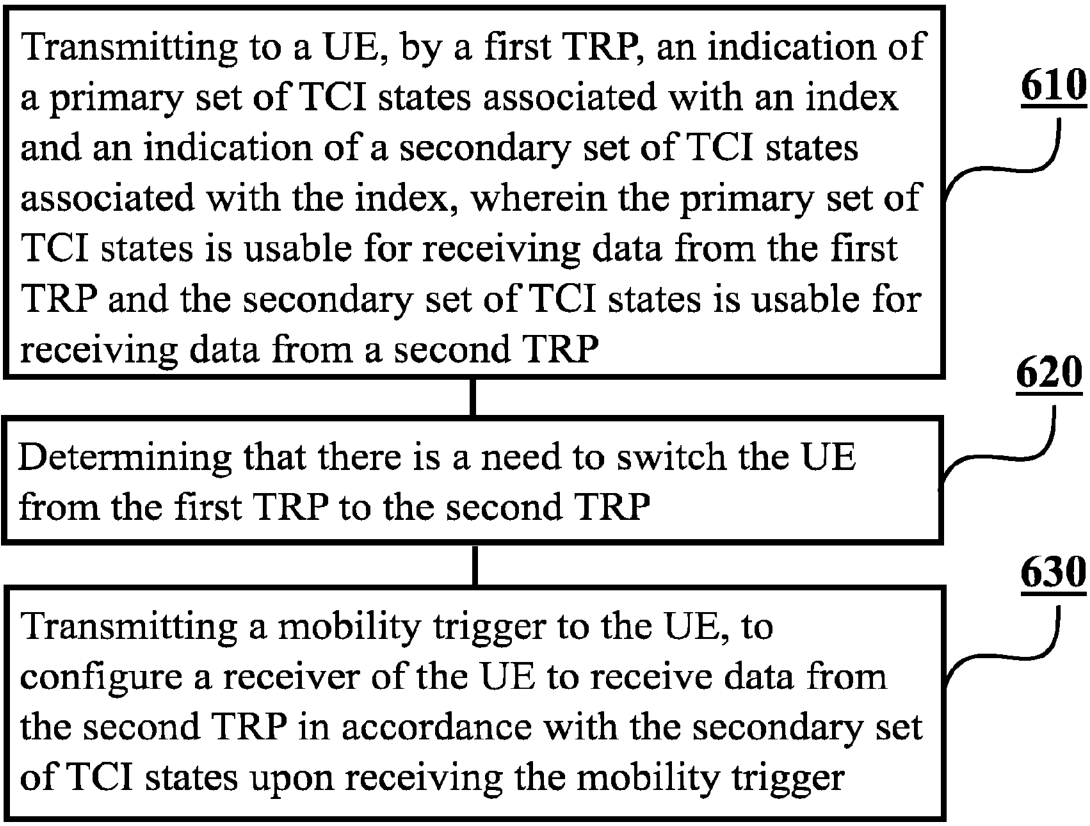
FIG. 6 illustrates a flow graph of a second method in accordance with at least some embodiments.

FIG. 6 is a flow graph of a second method in accordance with at least some embodiments. The phases of the illustrated second method may be performed by first TRP 120*a*, or by a control device configured to control the functioning thereof, possibly when installed therein.

The second method may comprise, at step 610, transmitting to a UE, by a first TRP, an indication of a primary set of TCI states associated with an index and an indication of a secondary set of TCI states associated with the index, wherein the primary set of TCI states is usable for receiving data from the first TRP and the secondary set of TCI states is usable for receiving data from a second TRP. The second method may also comprise, at step 620, determining that there is a need to switch the UE from the first TRP to the second TRP. Finally, the second method may comprise, at step 630, transmitting a mobility trigger to the UE, to configure a receiver of the UE to receive data from the second TRP in accordance with the secondary set of TCI states upon receiving the mobility trigger.

It is to be understood that the embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

In an exemplary embodiment, an apparatus, such as, for example, UE 110 or first TRP 120*a*, or a control device configured to control the functioning thereof, may comprise means for carrying out the embodiments described above and any combination thereof.

In an exemplary embodiment, a computer program may be configured to cause a method in accordance with the embodiments described above and any combination thereof. In an exemplary embodiment, a computer program product, embodied on a non-transitory computer readable medium, may be configured to control a processor to perform a process comprising the embodiments described above and any combination thereof.

In an exemplary embodiment, an apparatus, such as, for example, UE 110 or first TRP 120*a*, or a control device configured to control the functioning thereof, may comprise at least one processor, and at least one memory including computer program code, wherein the at least one memory and the computer program code are configured to, with the at least one processor, cause the apparatus at least to perform the embodiments described above and any combination thereof.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the embodiments in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments find industrial application in communication networks, for example in cellular communication networks, such as in 5G networks.

| ACRONYMS LIST | |
|---|---|
| 3GPP | 3rd Generation Partnership Project |
| BS | Base Station |
| CPE | Customer Premises Equipment |
| DCI | Downlink Control Information |
| GSM | Global System for Mobile communication |
| IoT | Internet of Things |
| LTE | Long-Term Evolution |
| M2M | Machine-to-Machine |
| MTC | Machine Type Communications |
| NFC | Near-Field Communication |
| NR | New Radio |
| PCI | Physical Cell Identity |
| PDCCH | Physical Downlink Control Channel |
| PDSCH | Physical Downlink Shared Channel |
| QCL | Quasi Co-Location |
| RAN | Radio Access Network |
| RAT | Radio Access Technology |
| RRC | Radio Resource Control |
| TCI | Transmission Configuration Indication |
| TRP | Transmission Point |
| UE | User Equipment |
| UI | User Interface |
| WCDMA | Wideband Code Division Multiple Access |

| REFERENCE SIGNS LIST | |
|---|---|
| 110 | UE |
| 120a-c | TRP |
| 210-290 | Phases of the signaling graph of FIG. 2 |
| 400-470 | Structure of the apparatus of FIG. 4 |
| 510-530 | Phase of the first method in FIG. 5 |
| 610-630 | Phase of the second method in FIG. 6 |

The invention claimed is:

1. A method, comprising: receiving from a first Transmission and Reception Point (TRP), by a user equipment, an indication of a primary set of Transmission Configuration Indication (TCI) states associated with an index and an indication of a secondary set of TCI states associated with the index, wherein the primary set of TCI states is usable for receiving data from the first TRP and the secondary set of TCI states is usable for receiving data from a second TRP; configuring a receiver of the user equipment to receive data from the first TRP in accordance with the primary set of TCI states; and receiving, by the user equipment, a mobility trigger and configuring the receiver of the user equipment to receive data from the second TRP in accordance with the secondary set of TCI states upon receiving the mobility trigger; wherein the mobility trigger is based on implicit signalling, wherein the implicit mobility trigger is based on another information field received within downlink control information, wherein an indication within said another information field works as the mobility trigger only when there is the secondary set of TCI states, and wherein the indication within said another information field is a TCI state belonging to the primary set of TCI states and the secondary set of TCI states.

2. A method, comprising: transmitting to a user equipment, by a first Transmission and Reception Point (TRP), an indication of a primary set of Transmission Configuration Indication (TCI) states associated with an index and an indication of a secondary set of TCI states associated with the index, wherein the primary set of TCI states is usable for receiving data from the first TRP and the secondary set of TCI states is usable for receiving data from a second TRP; determining that there is a need to switch the user equipment from the first TRP to the second TRP; and transmitting a mobility trigger to the user equipment, to configure a receiver of the user equipment to receive data from the second TRP in accordance with the secondary set of TCI states upon receiving the mobility trigger; wherein the mobility trigger is based on implicit signalling, wherein the implicit mobility trigger is based on another information field received within downlink control information, wherein an indication within said another information field works as the mobility trigger only when there is the secondary set of TCI states.

3. The method according to claim 2, wherein at least a part of the primary set of TCI states is different compared to the secondary set of TCI states.

4. The method according to claim 2, wherein the secondary set of TCI states is not to be used to receive data by the user equipment before receiving the mobility trigger.

5. The method according to claim 2, wherein the primary set of TCI states and the secondary set of TCI states are not to be used at the same time.

6. The method according to claim 2, wherein the same index is associated with the first TRP and the second TRP.

7. The method according to claim 2, wherein the index is a control resource set pool index which is used to differentiate a set of control resources used by the first TRP and a third TRP.

8. The method according to claim 2, further comprising:

transmitting, by the first TRP, a parameter in downlink control information to the user equipment, wherein the parameter is related to the mobility trigger when the secondary set of TCI indication states is activated.

9. The method according to claim 2, wherein the indication within the another information field is a TCI state belonging to the primary set of TCI states and the secondary set of TCI states.

* * * * *